United States Patent
Yang et al.

(10) Patent No.: US 11,625,143 B1
(45) Date of Patent: Apr. 11, 2023

(54) METHOD AND DEVICE FOR SHARING DATA, ELECTRONIC DEVICE, AND STORAGE MEDIUM

(71) Applicant: BEIJING XIAOMI MOBILE SOFTWARE CO., LTD., Beijing (CN)

(72) Inventors: Huiying Yang, Beijing (CN); Zetan Pei, Beijing (CN); Zhenzhou Lu, Beijing (CN); Jiayan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/825,194

(22) Filed: May 26, 2022

(30) Foreign Application Priority Data

Dec. 21, 2021 (CN) .......................... 202111572186.4

(51) Int. Cl.
*G06F 3/04817* (2022.01)
*H04W 4/80* (2018.01)
*G06F 3/0487* (2013.01)

(52) U.S. Cl.
CPC ........ *G06F 3/04817* (2013.01); *G06F 3/0487* (2013.01); *H04W 4/80* (2018.02)

(58) Field of Classification Search
CPC ..... G06F 3/04817; G06F 3/0487; H04W 4/80
See application file for complete search history.

(56) References Cited

U.S. PATENT DOCUMENTS

| | | | |
|---|---|---|---|
| 8,941,556 B1* | 1/2015 | Meyers | G09G 5/00 345/169 |
| 2008/0165148 A1* | 7/2008 | Williamson | G06F 3/04883 345/173 |
| 2008/0235593 A1* | 9/2008 | Nagata | G06F 16/168 715/733 |
| 2015/0289124 A1* | 10/2015 | Palin | H04M 1/72412 455/41.2 |
| 2019/0272141 A1 | 9/2019 | Poel et al. | |

FOREIGN PATENT DOCUMENTS

| | | |
|---|---|---|
| CN | 103916162 A | 7/2014 |
| WO | WO 2021072912 A1 | 4/2021 |
| WO | WO 2021072926 A1 | 4/2021 |

OTHER PUBLICATIONS

European Patent Application No. 22176024.2, Search and Opinion dated Nov. 29, 2022, 8 pages.

* cited by examiner

*Primary Examiner* — Stephen G Sherman
(74) *Attorney, Agent, or Firm* — Cozen O'Connor

(57) ABSTRACT

A method and an apparatus for sharing data includes an electronic device and a storage medium. The method includes displaying a data sharing interface. The data sharing interface includes triggering areas respectively corresponding to data sources and association areas respectively corresponding to associated devices. The method further includes in response to a pairing operation of a user between a triggering area and an association area, acquiring data from a target data source corresponding to the triggering area, and transmitting the acquired data to a target associated device corresponding to the association area such that the target associated device outputs the received data. An electronic device and a storage medium are also disclosed.

18 Claims, 5 Drawing Sheets

METHOD AND DEVICE FOR SHARING DATA, ELECTRONIC DEVICE, AND STORAGE MEDIUM

CROSS REFERENCE TO RELATED APPLICATION

The present application claims the benefit of priority to Chinese Patent Application No. 202111572186.4, filed on Dec. 21, 2021, the content of which is incorporated herein by reference in its entirety for all purposes.

BACKGROUND

With the growth in living standards, a single user may own multiple electronic devices such as smartphones, tablets, laptops, speakers, smart televisions, etc. In order to provide users with a good user experience, devices produced by major device manufacturers usually support an interconnection function, such that the multiple devices owned by the same user can work together.

SUMMARY

The disclosure relates to a field of terminal technologies, and more particularly, to a method and a device for sharing data, an electronic device, and a storage medium.

According to a first aspect of the disclosure, there is provided a method for sharing data. The method includes:

displaying, by a terminal, a data sharing interface, in which the data sharing interface contains triggering areas respectively corresponding to data sources and association areas respectively corresponding to associated devices; and in response to a pairing operation of a user between a triggering area and an association area, obtaining, by the terminal, data from a target data source corresponding to the triggering area and transmitting the data to a target associated device corresponding to the association area, such that the data is output by the target associated device.

According to a second aspect of the disclosure, there is provided an electronic device. The electronic device includes:

a processor; and a memory, for storing instructions executable by the processor;

in which the processor is configured to implement a method of the first aspect by running the instructions.

According to a third aspect of the disclosure, there is provided a non-transitory computer-readable storage medium, having instructions stored thereon, in which when instructions are executed by a processor of an electronic device, a method of the first aspect is executed.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Figure 1:
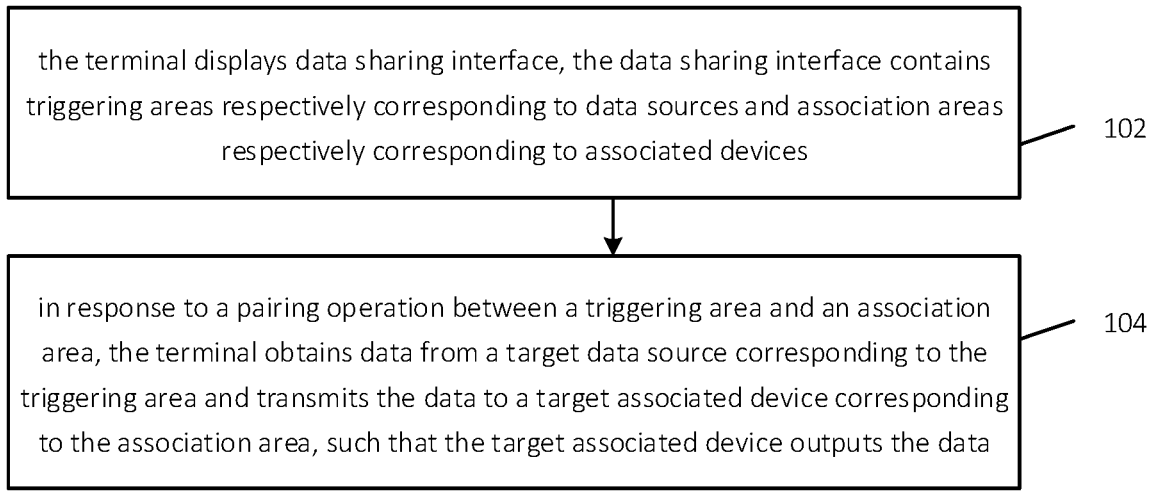
FIG. 1 is a flowchart illustrating a method for sharing data in accordance with an embodiment of the disclosure.

Embodiments will be described in detail herein, examples of which are illustrated in the accompanying drawings. When the following description refers to the drawings, the same numerals in different drawings refer to the same or similar elements unless otherwise indicated. The implementations described in the illustrative examples below are not intended to represent all implementations consistent with this disclosure. Rather, they are merely examples of apparatus and methods consistent with some aspects of the disclosure as recited in the appended claims.

The terminology used in the disclosure is for the purpose of describing particular embodiments and is not intended to limit the disclosure. As used in this disclosure and the appended claims, the singular forms "a," "an," and "the" are intended to include the plural forms as well, unless the context clearly dictates otherwise. It will also be understood that the term "and/or" as used herein refers to and includes any and all possible combinations of one or more of the associated listed items.

It is understandable that although the terms "first," "second," "third," etc. may be used in this disclosure to describe various pieces of information, such information should not be limited by these terms. These terms are used to distinguish the same type of information from each other. For example, the first information may also be referred to as the second information, and similarly, the second information may also be referred to as the first information, without departing from the scope of the disclosure. Depending on the context, the word "if" as used herein can be interpreted as "at the time of" or "when" or "in response to determining."

In the related art, the applications (also called application programs, APP) installed in the terminal can be shared, such that the user can obtain a good use experience through the collaborative work between different devices.

In detail, the user can access a control panel of a terminal through a setting icon of the terminal, find and trigger an operation access entrance of the function for sharing APPs after multiple selection operations, to open the APP sharing interface. After opening the APP sharing interface, the user can select a specific APP and instruct the terminal to share the selected APP.

It can be seen that in the related art, the data is shared with another device in a form of APPs, and the operation access entrance of the function of sharing APPs is deep, resulting in a long operation path and cumbersome operations for sharing the APPs. In addition, since APPs are allowed to be shared, the generated data cannot be shared at other granularities, and data sharing is limited.

In view of this, the disclosure proposes a method for sharing data, which can share data of a terminal with another device by taking the data source as a unit, without the need of performing the data sharing operation through a control panel as described in the related art. Therefore, a problem of cumbersome operations when sharing the data of the terminal is solved. In addition, the method enables the user to select the data source to be shared and the device to be shared in an intuitive way, simplifying the data sharing operation.

FIG. 1 is a flowchart illustrating a method for sharing data in accordance with an embodiment of the disclosure. The method is applied to a terminal. As illustrated in FIG. 1, the method includes the following.

In block 102, a data sharing interface is displayed. The data sharing interface contains triggering areas respectively corresponding to data sources and association areas respectively corresponding to associated devices. That is, the triggering areas correspond to the data sources one by one. The association areas correspond to the associated devices one by one.

It can be seen from the above that the problem, existing in the related art, that the operations needed for sharing data are complicated is caused by the fact that the operation access entrance of the function of sharing APPs is deep, such that multiple selection operations are needed before the function of sharing APPs is activated.

In view of this, the disclosure no longer sets the operation access entrance of the sharing function on the control panel, but displays the data sharing interface that contains the "triggering areas respectively corresponding to the data sources and the association areas respectively corresponding to the associated devices" to allow the user to share the data from a corresponding data source to another associated device by pairing the triggering areas and the association areas.

It is understandable that, with the method according to the disclosure, the data obtained from a certain data source can be shared by performing the pairing operation, which solves the problem of cumbersome operations caused by sharing data through the control panel of the terminal in the related art. In addition, the disclosure uses the data source as a unit to share the data generated by the terminal, breaking the status quo that the data can be shared through APPs in the related art.

In the disclosure, an operation access entrance for providing the data sharing function can be displayed by the terminal, and the user can access the data sharing interface by triggering the operation access entrance. On the data sharing interface, the triggering areas respectively corresponding to the data sources can be presented in various forms. For example, the triggering area of each data source can be presented in the form of widget, in the form of label, or in the form of icon. Similarly, the association area corresponding to each associated device can be presented in various forms. For example, the association areas can be presented in the form of widget, in the form of label, or in the form of icon. Certainly, the above examples are illustrative, and the specific form in which the triggering areas and the association areas presented on the data sharing interface can be determined by a person skilled in the art according to the actual situation, which is not limited in the disclosure.

In the disclosure, when displaying the association areas respectively corresponding to the associated devices on the data sharing interface, type labels of the associated devices may be added in the association areas. The type label is configured to represent the device type of the corresponding associated device. For example, the type label can be configured to indicate that a device is a display type device, an audio type device, or a printing type device. Thus, the type label added in the association area of the associated device like smart television (TV) and display can be the display type device, the type label added in the association area of the associated device like Bluetooth speaker and ordinary speaker can be the audio type device, and the type label added in the association area of the associated device like printer and copier can be printing type device. Certainly, the above examples are illustrative, and what type label to be added and how to add the type label in each association area can be determined by those skilled in the art according to actual requirements, which are not limited in the disclosure.

In the disclosure, different pairing modes can be set according to actual requirements.

For example, the pairing operation can be a "moving operation that moves the triggering area to the association area". In detail, when detecting that a triggering area is moved, for example by the user, to an association area, the terminal can determine that it has been detected there is the pairing operation between the triggering area and the association area. Alternatively, the pairing operation can be a "moving operation that moves the association area to the triggering area", and the specific detection method is similar to the foregoing case, which is not repeated here.

In the disclosure, the user can long press the triggering area to make the triggering area move along with a triggering trajectory, such that the user can move the triggering area to the association area. In the process of moving the triggering area, operations such as transparency and zooming can be performed on the triggering area to prompt the user that the triggering area is being moved. Certainly, moving the association area is similar to the foregoing case, which is not repeated here.

Alternatively, the pairing operation can be a "sliding operation from the triggering area to the association area". In detail, when detecting the sliding operation from a triggering area to an association area, the terminal may determine that it has been detected there is the pairing operation between the triggering area and the association area. Alternatively, the pairing operation can be a "sliding operation from the association area to the triggering area", and the specific detection method is similar to the foregoing case, which is not repeated here.

In some examples, the sliding trajectory can be restricted. For example, sliding trajectories corresponding to the pairing operation may be defined in advance. When the sliding trajectory of the user from a triggering area to an association area matches one of the pre-defined sliding trajectories, it is determined that it has been detected there is the pairing operation between the triggering area and the association area. In addition, the sliding trajectories can be defined similarly for the case of sliding from the association area to the triggering area, which is not repeated here.

In some examples, a preset duration may be set. Within the preset duration, in response to detecting two continuous triggering operations of clicking on a triggering area and an association area by the user respectively, it is determined that is has been detected there is the pairing operation between the triggering area and the association area. In actual operation, after detecting that a triggering area is triggered, the terminal starts timing to determine whether there is a triggering operation performed on an association area within the preset duration. Certainly, the above example is illustrative, and the determination can be made by those skilled in the art according to the actual situations, which is not limited in the disclosure.

In the disclosure, before displaying the associated devices on the data sharing interface, it needs to determine the associated devices of the terminal. In the disclosure, different device can be determined as the associated device of the terminal depending on the actual requirement.

In an example, the terminal may determine connected devices that have been connected with the terminal as the associated devices. For example, the terminal can establish data transmission channels between the terminal and other devices through the network, the local area network, or short-range communication technologies such as Bluetooth and NFC (Near Field Communication), such that other devices can be determined as the connected devices that have been connected with the terminal.

As another example, the terminal may determine to-be-connected devices that are able to establish connections with the terminal as the associated devices of the terminal. In detail, the terminal may determine a to-be-connected device that is able to establish the data transmission channel with the terminal based on the network or the short-range transmission function carried by the terminal, as an associated device of the terminal. For example, when the terminal determines the to-be-connected devices through the Bluetooth technology, the terminal can enable the Bluetooth function to search for nearby devices that have the Bluetooth pairing function enabled, and determine the searched devices as the associated devices.

Certainly, in actual operation, both the connected devices and the to-be-connected devices can be determined as the associated devices of the terminal. How to determine the associated devices of the terminal can be determined by those skilled in the art according to the actual situation, which is not limited in the disclosure.

It is to be noted that when the user selects an association area of a to-be-connected device through the pairing operation, that is, when the determined target associated device is a to-be-connected device, a data transmission channel needs to be established between the to-be-connected device and the terminal first, for data sharing. In detail, the terminal can establish the data transmission channel between the terminal and the to-be-connected device based on the network where the terminal is located or the near-field communication function, such that after the to-be-connected device is connected with the terminal, and the data transmission is performed.

At block 104, in response to the pairing operation of the user between the triggering area and the association area, data is obtained from a target data source corresponding to the triggering area and is transmitted to a target associated device corresponding to the association area, such that the target associated device outputs received data.

In the disclosure, after detecting the pairing operation of the user between the triggering area and the association area, the data source corresponding to the triggering area can be determined as the target data source, and the associated device corresponding to the association area can be determined as the target associated device. On this basis, the data can be acquired from the determined target data source, and the acquired data can be sent to the determined target associated device, such that the target associated device can output the received data.

In the disclosure, the data sources can be classified based on various dimensions. When the dimensions used for classifying the data sources are different, there are also certain differences in the granularity of data sharing.

In some examples, the data sources may be classified based on functional modules included in the terminal. In detail, the terminal may include an audio module, a display module, a vibration module, and the like. When one of the above-mentioned modules is determined as the target data source, the data for realizing the corresponding function can be transmitted to the target associated device, such that the target associated device can realize the same function based on the received data.

As an example, when the target data source determined by the user based on the pairing operation is the audio module, the terminal can acquire audio data for implementing the audio playback function from the audio module, and transmit the acquired audio data to the target associated device determined based on the pairing operation. On this basis, the target associated device can output a sound signal according to the received audio data.

As another example, when the target data source determined by the user based on the pairing operation is the display module, the terminal can acquire screen display data for implementing the screen display function from the display module and transmit the acquired screen display data to the target associated device determined based on the pairing operation. On this basis, the target associated device can generate a mirror image of the screen of the terminal according to the received screen display data, and display the generated mirror image.

Alternatively, like the related art, the APPs installed in the terminal can be used as the data source in the disclosure. In this case, when the user determines an APP as the target data source based on the pairing operation, the terminal can acquire interface drawing data of the APP interface from the APP and transmit the acquired interface drawing data to the target associated device determined based on the pairing operation of the user. On this basis, the target associated device can draw the APP interface of the APP based on the received interface drawing data, and display the drawn APP interface.

The APP sharing for the APP is realized by transmitting the interface drawing data of the APP interface, such that compared with the APP sharing method in the related art, the APP can be shared without the need of installing the same APP on both the terminal and the target associated device. The problem, existing in the related art, such as extra storage space occupied due to the need to install the same APP on different devices can be solved.

In the process of APP sharing, in the disclosure, the data can be transferred between different associated devices, such that the associated devices can be quickly switched and changed for APP sharing when the terminal is moved.

In some examples, the terminal may set a preset distance for determining whether to transfer the data. The present distance is obtained based on the data transmission module of the terminal. For example, when the terminal uses the Bluetooth module, since the data transmission distance of the Bluetooth module ranges from 8 meters to 30 meters, the preset distance can be set as 30 meters. The terminal can use other data transmission module, such as the short-range transmission module and the preset distance can be set accordingly, which is not described herein. In detail, the terminal can monitor its own location information to determine whether there is a movement. When it is detected that the terminal moves, the distance between the terminal and another associated device other than the target associated device can be monitored to determine whether to transfer the data. When it is detected that the distance between the terminal and another associated device is less than the preset distance, the data obtained from the target data source can be transmitted to the another associated device, such that the another associated device can output the received data.

In the disclosure, there may be a premise of transferring the data, e.g., "there is a device of the same type as the target device among the associated devices of the terminal". Under this premise, a device of the same type as the target device can be determined as an alternative target associated device, such that when corresponding conditions are met, the data obtained from the target data source is transmitted to the alternative target associated device. In detail, when the terminal moves, the distance between the terminal and the alternative target associated device can be monitored. When it is detected that the distance between the terminal and the alternative target associated device is less than the preset distance, the data obtained from the target data source can be transmitted to the alternative target associated device, such that the data can be output by the alternative target associated device.

For example, the user intends to transmit the video playback data of a smartphone to a smart TV in the living room, and when the user walks into the bedroom from the living room with the smartphone in hand, it is detected that the distance between the smartphone and another smart TV in the bedroom is less than the preset distance. In this case, the video playback data of the smartphone is transmitted to the smart TV in the bedroom.

When there are devices of the same type as the target device among the associated devices of the terminal, the terminal may directly compare respective distances between the terminal and the devices of the same type to determine whether to transfer the data. Similar to the above-mentioned case, the devices of the same type may be referred to as the alternative target associated device. In detail, when the terminal moves, the distance between the terminal and the target device and the distance between the terminal and each alternative target associated device can be monitored. When the distance between the terminal and the target associated device is smaller than the distance between the terminal and an alternative target associated device, the data obtained from the target data source can be transmitted to the alternative target associated device, such that the received data can be output by the alternative target associated device.

It is to be noted that no matter which mode is used to transfer the data, the terminal can either stop transmitting the data to the target associated device after transferring the data obtained from the target data source to the another associated device other than the target associated device; or transmit the data obtained from the target data source to both the target associated device and the another associated device.

In the disclosure, in addition to sharing data, the associated devices can be controlled through the terminal. In detail, the user can trigger an association area on the data sharing interface to open a control interface of the corresponding associated device. The control interface may include several operation controls of the associated device. When an operation control is triggered, the terminal can generate a control instruction corresponding to the operation control, and send the control instruction to the corresponding associated device to instruct the associated device to perform the operation corresponding to the operation control.

For example, when the user triggers the association area of the Bluetooth speaker, the control interface of the Bluetooth speaker can be displayed. The control interface can include a volume up control, a volume down control, a pause control, etc. When the user triggers the volume down control, the terminal can generate a control instruction for instructing the Bluetooth speaker to reduce the volume, and send the control instruction to the Bluetooth speaker through the data transmission channel established based on the Bluetooth technology to instruct the Bluetooth speaker to reduce the volume.

It is to be noted that the terminal and the associated devices of the terminal mentioned in the disclosure can be any type of electronic device. For example, the terminal and its associated device can be mobile terminals, such as smartphone and tablet computer, or fixed terminals, such as smart TV and personal computer. The terminal and its associated devices may be the same type or different types of electronic device. The specific type of the terminal and its associated devices can be determined by those skilled in the art according to actual requirements, which is not limited in the disclosure.

With the above technical solutions according to the disclosure, the triggering area corresponding to each data source and the association area corresponding to each associated device are displayed on the data sharing interface, such that the user can perform the pairing operation on the triggering areas and the association areas to select a data source and an associated device such that the data from the data source is shared to the associated device. In detail, after detecting the pairing operation of the user between the triggering area and the association area, the terminal can determine the data source corresponding to the triggering area as the target data source, and the associated device corresponding to the association area as the target associated device. On this basis, the terminal can acquire data from the target data source and transmit the acquired data to the target associated device, such that the target associated device can output the received data.

It is understandable that the disclosure provides an independent data sharing interface including the triggering areas corresponding to the data sources and the association areas corresponding to the associated devices, such that the data to be shared and the associated device can be selected by performing the pairing operation between the triggering areas and the association areas. Therefore, the problem of complicated operations caused sharing data in the related art since the APP selection and the device selection are performed through the control panel of the terminal can be solved.

In addition, the related art allows sharing of APPs, which limits the granularity of data sharing. For example, in the process of sharing a video type APP in the related art, all video-related data such as video audio data and picture data are transmitted to the same device, and the audio data and the image data cannot be transmitted separately. Furthermore, in sharing the video type APP, the data is allowed to be shared to devices with the screen display function, such as smart TV, PC, etc., and is not allowed to be shared to devices without the screens display function, such as Bluetooth speaker. In practical uses, it is possible that the user wants to listen to the audio data of the video and does not want to watch the image data of the video. In this case, the audio data of the video type APP needs to be transmitted to the Bluetooth speaker and the image data of the video type APP does not need to be transmitted. However, in the related art, not only the audio data and the image data cannot be separately shared, but also the video type APP cannot be shared with the audio playback device, such as Bluetooth speaker. That is, the APP sharing method in the related art not only cannot share data in units other than APP, but also limits the types of device to which various types of APPs are shared. Compared with the related art, in the disclosure, the data is shared in a unit of data sources, breaking the status quo that APPs are allowed to be shared in the related art. For example, in sharing the audio part of a video, in the disclosure, the audio data of the video type APP can be obtained from an audio module of the terminal and shared to the Bluetooth speaker for playback. In this way, a problem existing in the related art that the data can be shared in the unit of APPs is solved and the types of devices to which the data is to be shared is not limited by the type of APP.

Hereinafter, the technical solution of the disclosure will be introduced by taking the sharing of audio data of a smartphone to a Bluetooth speaker as an example.

Figure 2:
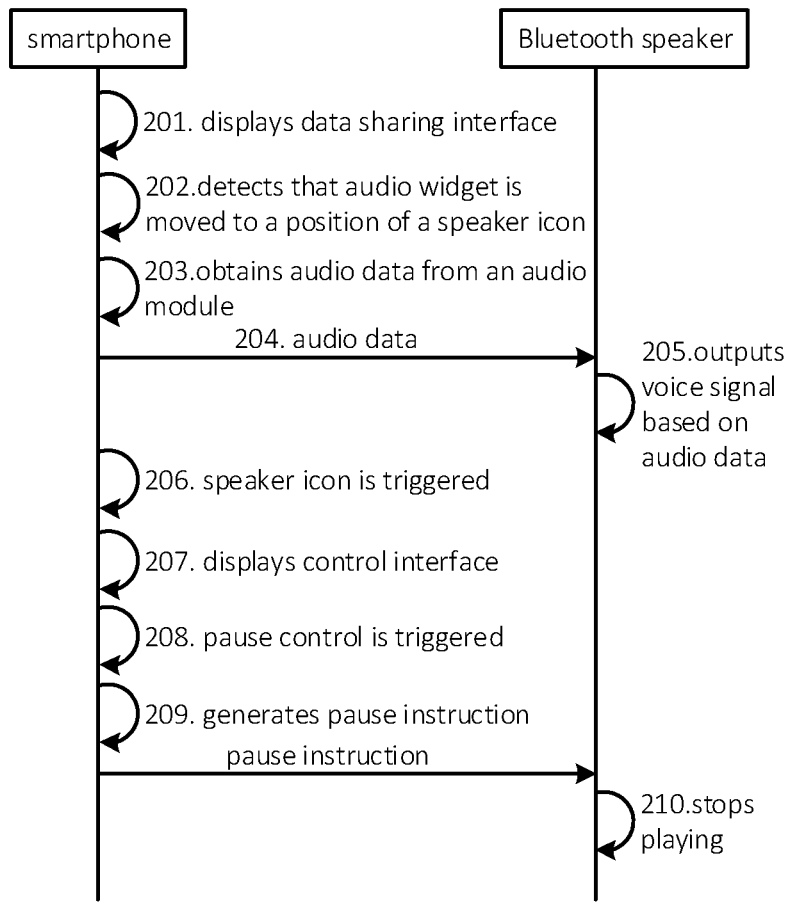
FIG. 2 is schematic diagram illustrating an interaction process of a method for sharing data in accordance with an embodiment of the disclosure.

FIG. 2 is a schematic diagram illustrating an interaction process of a method for sharing data in accordance with an embodiment of the disclosure. As illustrated in FIG. 2, the method includes the following.

At block 201, the smartphone displays a data sharing interface.

An operation access entrance of the data sharing interface can be set on the smartphone, such that the user can enter the data sharing interface by triggering the operation access entrance.

Figure 3:
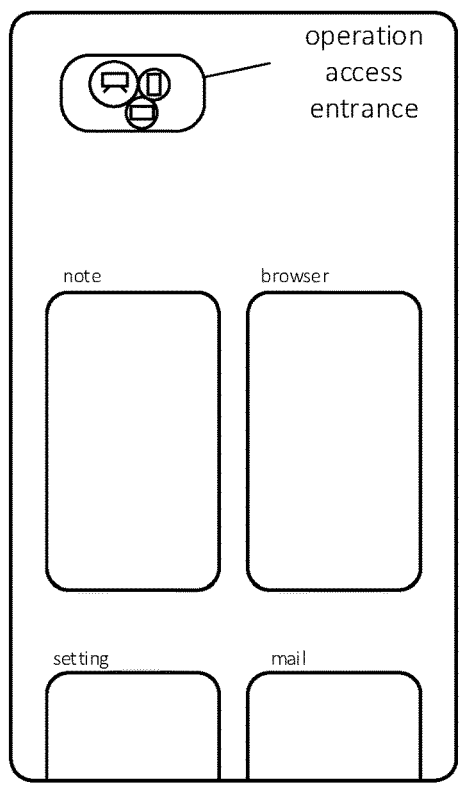
FIG. 3 is a schematic diagram illustrating an operation access entrance of a data sharing interface in accordance with an embodiment of the disclosure.

For example, the operation access entrance of the data sharing interface is illustrated in FIG. 3. The data sharing interface opened by triggering the operation access entrance is illustrated as FIG. 4.

Figure 4:
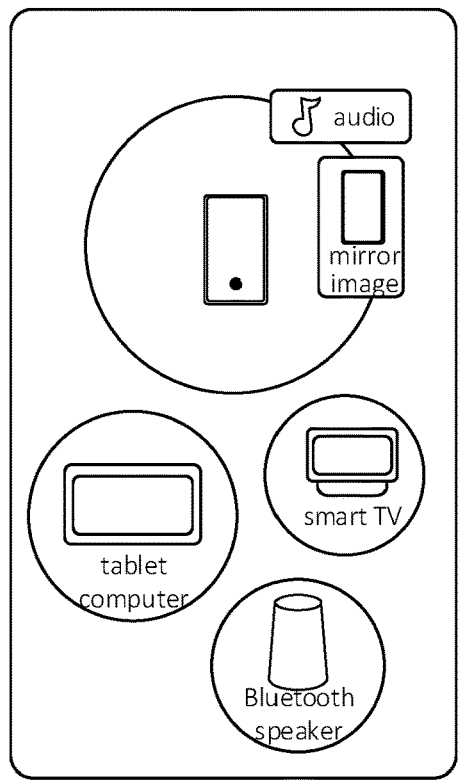
FIG. 4 is a schematic diagram illustrating a data sharing interface in accordance with an embodiment of the disclosure.

On the data sharing interface illustrated as FIG. 4, several widgets corresponding to different data sources may be included, for example, the audio widget, the mirror image widget, etc. It is understandable that although in FIG. 4, the widgets respectively correspond to different functional modules and the data sources corresponding to the widgets are corresponding functional modules, in practical uses, more widgets can be displayed, such as widgets corresponding to different APPs.

The data sharing interface illustrated as FIG. 4 may also include device icons corresponding to associated devices, for example, a smart TV icon, a Bluetooth speaker icon, a tablet computer icon, etc.

It is to be noted that, in addition to establishing the data transmission channel between the devices owned by the user, the user can log in to each device with the same system account, such that each device becomes an associated device of each other. For example, the smartphone, the Bluetooth speaker, the smart TV, the tablet computer illustrated in FIG. 4 can all be logged in with the same system account such that they become each other's associated devices.

At block 202, the smartphone detects that the audio widget on the data sharing interface is moved to a position of a speaker icon of the Bluetooth speaker.

Figure 5:
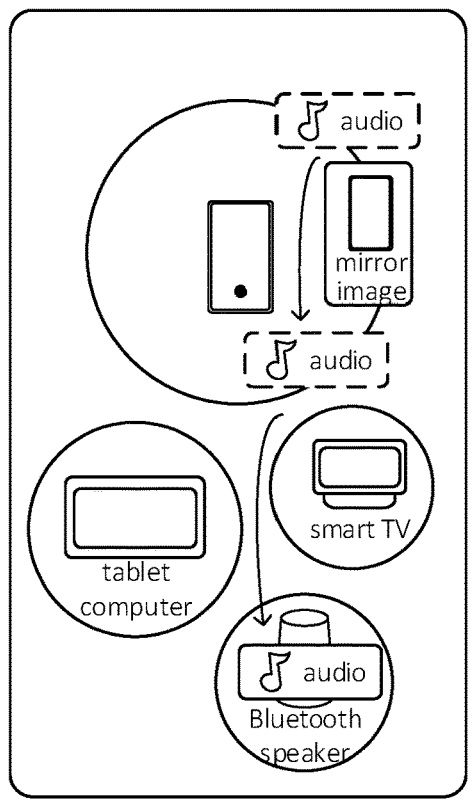
FIG. 5 is a schematic diagram illustrating a pairing operation in accordance with an embodiment of the disclosure.

The user can long press the audio widget to drag the audio widget to the position of the speaker icon of the Bluetooth speaker as shown in FIG. 5, to instruct the smartphone to transmit the audio data obtained from the audio module corresponding to the audio widget to the Bluetooth speaker such that the Bluetooth speaker outputs the received audio data.

Certainly, the case "outputting the audio data of the smartphone through the Bluetooth speaker" is an example. In actual operation, the user can share other data to other devices by moving other widgets to the positions of icons of other devices. For example, the mirror image widget illustrated in FIG. 4 can be moved to the position of the icon of the smart TV, such that the smart TV displays the mirror image of the screen of the smartphone.

At block 203, the smartphone acquires the audio data from the audio module corresponding to the audio widget.

After determining that the audio widget is moved to the position of the icon of the Bluetooth speaker, the audio data that is being played can be obtained from the audio module, and the audio data can be transmitted to the Bluetooth speaker.

At block 204, the smartphone transmits the acquired audio data to the Bluetooth speaker.

At block 205, the Bluetooth speaker outputs a sound signal according to the audio data.

After acquiring the audio data, the Bluetooth speaker can convert the audio data into the sound signal through an audio output module.

At block 206, the smartphone detects there is a triggering operation on the speaker icon.

The smartphone can control the Bluetooth speaker. In detail, the user can open the control interface illustrated as FIG. 6 by clicking on the speaker icon, and control the Bluetooth speaker through several controls displayed on the control interface.

At block 207, the smartphone displays the control interface of the Bluetooth speaker.

Figure 6:
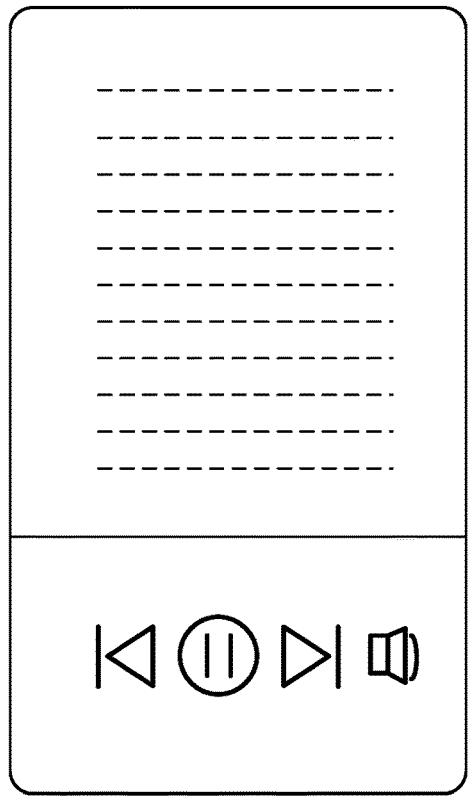
FIG. 6 is a schematic diagram illustrating a control interface in accordance with an embodiment of the disclosure.

For the Bluetooth speaker, as illustrated in FIG. 6, the control interface of the Bluetooth speaker can include a previous song control, a next song control, a playback/pause control, a volume adjusting control, etc.

At block 208, the smartphone detects that a pause control on the control interface is triggered.

The user can trigger the pause control during the audio playback to instruct the Bluetooth speaker to stop playing. In detail, after detecting that the pause control is triggered, the smartphone can generate a pause instruction for instructing the Bluetooth speaker to stop playing, and send the pause instruction to the Bluetooth speaker through the data transmission channel established based on the Bluetooth technology.

At block 209, the smartphone generates the pause instruction based on the pause control, and sends the pause instruction to the Bluetooth speaker.

At block 210, the Bluetooth speaker receives the pause instruction and stops outputting the audio data.

After the Bluetooth speaker receives the pause instruction, the Bluetooth can stop outputting the audio data.

In the disclosure, each data source in the smartphone can be displayed in the form of widget, and each associated device of the smartphone is displayed in the form of device icon. On this basis, the user can share the data from a data source to another device by moving the widget to the position of the device icon.

It is understandable that the operation method of moving the widget to the position of the device icon is not only convenient, but also conforms to the people's operating habits, such that the user can clearly know from the execution process of the moving operation that the operation is an operation for sharing the data.

In addition, the user can remotely control the device by triggering the device icon, opening the control interface of the device and triggering the control controls on the control interface.

Figure 7:
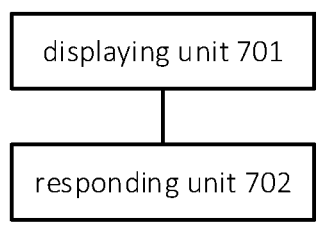
FIG. 7 is a block diagram illustrating an apparatus for sharing data in accordance with an embodiment of the disclosure.

FIG. 7 is a block diagram illustrating an apparatus for sharing data in accordance with an embodiment of the disclosure. As illustrated in FIG. 7, the apparatus includes a displaying unit 701 and a responding unit 702.

The displaying unit 701 is configured to display a data sharing interface. The data sharing interface contains triggering areas respectively corresponding to data sources and association areas respectively corresponding to associated devices.

The responding unit 702 is configured to in response to a pairing operation of a user between a triggering area and an association area, obtain data from a target data source corresponding to the triggering area, and transmit the data to a target associated device corresponding to the association area, to output the received data by the target associated device.

Alternatively, the displaying unit 701 is further configured to display an operation access entrance for providing a data sharing function.

When the operation access entrance is triggered, the data sharing interface is displayed.

Alternatively, the pairing operation includes one of a moving operation for moving the triggering area to the association area, a moving operation for moving the association area to the triggering area, a sliding operation for sliding from the triggering area to the association area, a sliding operation for sliding from the association area to the triggering area, and continuous triggering operations of clicking on the triggering area and the association area respectively within a preset duration.

Alternatively, the responding unit 702 is further configured to in response to determining that the target data source is an audio module of the terminal, acquire audio data from the audio module, and transmit the audio data to a target associated device corresponding to the association area, such that the target associated device outputs a sound signal based on the audio data.

Alternatively, the responding unit 702 is further configured to in response to determining that the target data source is a display module of the terminal, acquire screen display data of the terminal from the display module, and transmit the screen display data to a target associated device corresponding to the association area, such that the target associated device draws a mirror image of a screen of the terminal based on the screen display data, and displays the mirror image.

Alternatively, the responding unit 702 is further configured to in response to determining that the target data source is an APP installed in the terminal, acquire interface drawing data of an APP interface from the APP, and transmit the interface drawing data to the target associated device corresponding to the association area, such that the target associated device draws the APP interface of the APP based on the interface drawing data, and displays the APP interface.

Alternatively, the responding unit 702 is further configured to in response to detecting that the terminal moves, monitor a distance between the terminal and another associated devices other than the target associated device; in response to detecting that the distance between the terminal and another associated device is less than a preset distance, transmit the data obtained from the target data source to the another associated device, such that the another associated device outputs the data.

Alternatively, in response to determining that there is an alternative target associated device of the same type as the target associated device among the associated devices, the responding unit 702 is further configured to monitor a distance between the terminal and the alternative target associated device; and in response to detecting that the distance between the terminal and the alternative target associated device is less than a preset distance, transmit the data obtained from the target data source the alternative target associated device.

Alternatively, in response to determining that there is an alternative target associated device of the same type as the target associated device among the associated devices, the responding unit 702 is further configured to monitor a distance between the terminal and the target associated device and a distance between the terminal and the alternative target associated device when the terminal moves; and in response to determining that the distance between the terminal and the target associated device is smaller than the distance between the terminal and the alternative target associated device, transmit the data obtained from the target data source to the alternative target associated device, such that the data is output by the alternative target associated device.

Alternatively, the displaying unit 701 is further configured to add type labels to the association areas displayed on the data sharing interface based on a device type of each associated device.

The type label is one of a display type device, an audio type device, or a printing type device.

Alternatively, the responding unit 702 is further configured to: in response to a triggering operation of the user on an association area, display a control interface of the associated device corresponding to the association area; and when an operation control on the control interface is triggered, transmit an operation instruction corresponding to the operation control to the associated device corresponding to the association area, to instruct the associated device to perform operations corresponding to the operation control.

Figure 8:
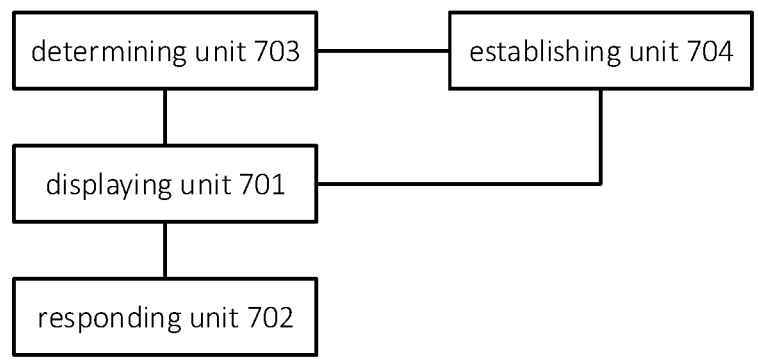
FIG. 8 is a block diagram illustrating another apparatus for sharing data in accordance with an embodiment of the disclosure.

As illustrated in FIG. 8, FIG. 8 is a block diagram illustrating another apparatus for sharing data in accordance with an embodiment of the disclosure. On the basis of the foregoing embodiment illustrated in FIG. 7, the method further includes: a determining unit 703, and an establishing unit 704.

The determining unit 703 is configured to determine a connected device that has established a data transmission channel with the terminal, and determine the connected device as at least a part of the associated devices; and/or, determine a to-be-connected device that is able to establish a data transmission channel with the terminal based on the network where the terminal is located or a built-in short-range communication function, and determine the to-be-connected device as at least a part of the associated devices.

The establishing unit 704 is further configured to establish the data transmission channel between the terminal and the target associated device based on the network where the terminal is located or a built-in short-range communication function in response to determining that the target associated device corresponding to the triggering area is a to-be-connected device.

For the apparatus embodiments, since they basically correspond to the method embodiments, reference may be made to the partial descriptions of the method embodiments for related parts. The device embodiments described above are illustrative. The units described as separate components may or may not be physically separated, and the components shown as units may or may not be physical units. That is, they may be located in one place, or they can be distributed over multiple network elements. Some or all of the modules can be selected according to actual needs to achieve the purpose of the solution of the disclosure. Those of ordinary skill in the art can understand and implement it without creative effort.

Correspondingly, the disclosure also provides an apparatus for sharing data, including a processor; and a memory for storing instructions executable by the processor. The processor is configured to implement the method for sharing data according to any one of the foregoing embodiments. For example, the method may include: displaying a data sharing interface. The data sharing interface includes triggering areas respectively corresponding to data sources and association areas respectively corresponding to associated devices. The method further includes in response to a pairing operation of a user between a triggering area and an association area, acquiring data from a target data source corresponding to the triggering area, and transmitting the acquired data to a target associated device corresponding to the association area such that the target associated device outputs the received data.

Correspondingly, the disclosure also provides an electronic device includes a memory and one or more programs. The one or more programs are stored in the memory and are executed by one or more processors such that instructions for implementing the method for sharing data as described in any of the foregoing embodiments included in the one or more programs are executed by the one or more processors. For example, the method may include: displaying a data sharing interface. The data sharing interface includes triggering areas respectively corresponding to data sources and association areas respectively corresponding to associated devices. The method further includes in response to a pairing operation of a user between a triggering area and an association area, acquiring data from a target data source corresponding to the triggering area, and transmitting the acquired data to a target associated device corresponding to the association area such that the target associated device outputs the received data.

With the method for sharing data according to embodiments of the disclosure, the triggering area corresponding to each data source and the association area corresponding to each associated device are displayed on the data sharing interface, such that the user can perform the pairing operation on the triggering areas and the association areas to select a data source and an associated device such that the data from the data source is shared to the associated device. In detail, after detecting the pairing operation of the user between the triggering area and the association area, the terminal can determine the data source corresponding to the triggering area as the target data source, and the associated device corresponding to the association area as the target associated device. On this basis, the terminal can acquire data from the target data source and transmit the acquired data to the target associated device, such that the target associated device can output the received data.

It is understandable that the disclosure share the data between different devices in a unit of data sources, breaking the status quo that APPs are allowed to be shared in the related art. In addition, the disclosure provides an independent data sharing interface including the triggering areas corresponding to the data sources and the association areas corresponding to the associated devices, such that the data to be shared and the associated device can be selected by performing the pairing operation between the triggering areas and the association areas. Therefore, the problem that complicated operations are needed for sharing data in the related art since the APP selection and the device selection are performed through the control panel of the terminal can be solved.

Figure 9:
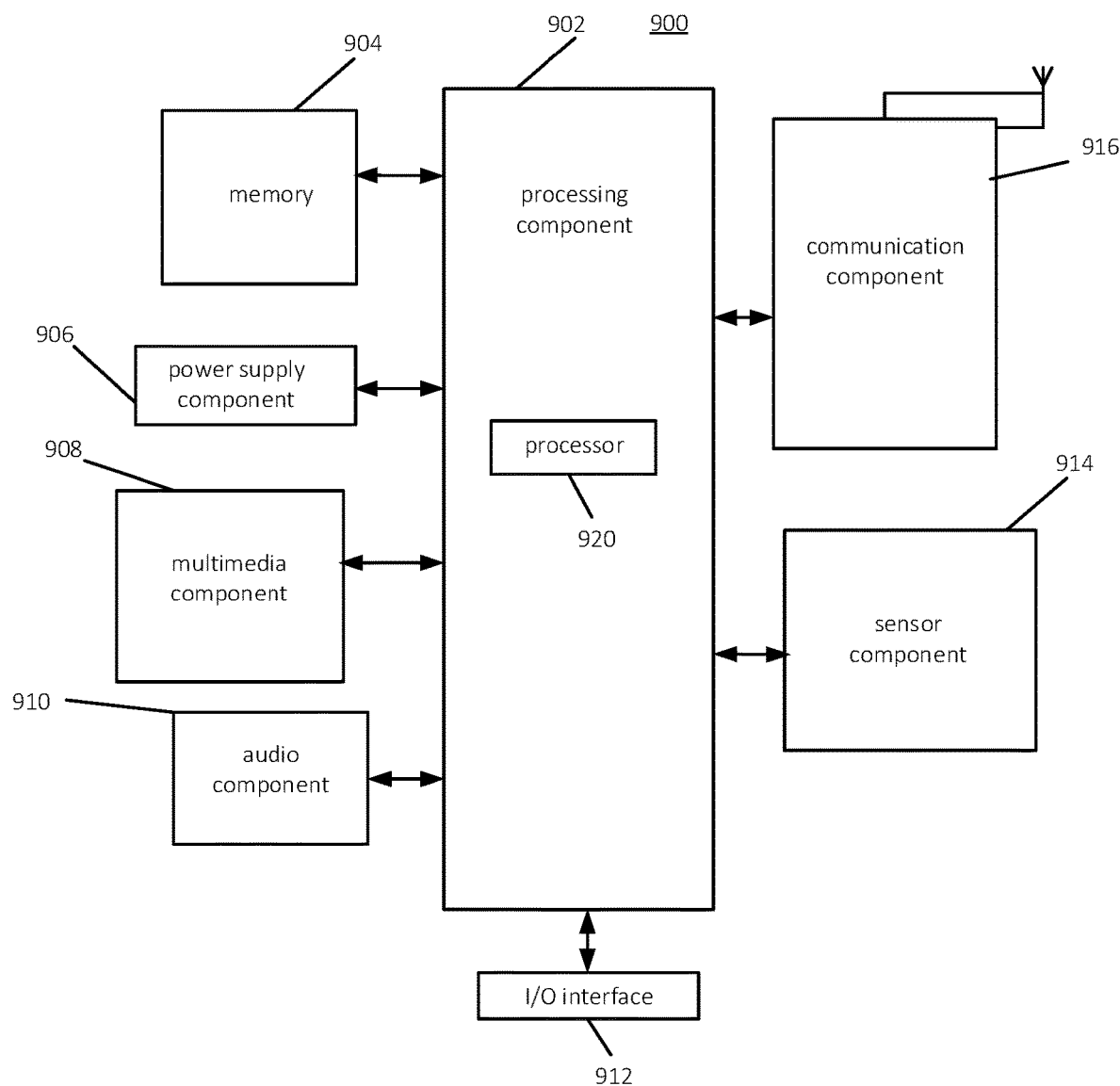
FIG. 9 is a schematic diagram illustrating an electronic device in accordance with an embodiment of the disclosure.

FIG. 9 is a block diagram illustrating an apparatus 900 in accordance with an embodiment of the disclosure. For example, the apparatus 900 can be a mobile phone, a computer, a digital broadcast terminal, a messaging device, a game console, a tablet device, a medical device, a fitness device, a personal digital assistant, and the like.

As illustrated in FIG. 9, the apparatus 900 may include one or more of the following components: a processing component 902, a memory 904, a power supply component 906, a multimedia component 908, an audio component 910, an input/output (I/O) interface 912, a sensor assembly 914, and the communication component 916.

The processing component 902 generally controls the overall operation of the apparatus 900, such as operations associated with display, phone calls, data communications, camera operations, and recording operations. The processing component 902 may include one or more processors 920 to execute instructions to perform all or some of the steps of the method described above. Additionally, processing component 902 may include one or more modules to facilitate interaction between processing component 902 and other components. For example, processing component 902 may include a multimedia module to facilitate interaction between multimedia component 908 and processing component 902.

The memory 904 is configured to store various types of data to support operations at the apparatus 900. Examples of such data include instructions for any use or method operating on the apparatus 900, contact data, phonebook data, messages, pictures, videos, and the like. The memory 904 may be implemented by any type of volatile or nonvolatile storage device or their combination, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Magnetic Disk or Optical Disk.

The power supply components 906 provides power to various components of the apparatus 900. The power supply components 906 may include a power management system, one or more power supplies, and other components associated with generating, managing, and distributing power to the apparatus 900.

The multimedia component 908 includes a screen that provides an output interface between the apparatus 900 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action. In some embodiments, the multimedia component 908 includes a front-facing camera and/or a rear-facing camera. When the apparatus 900 is in an operation mode, such as a shooting mode or a video mode, the front camera and/or the rear camera may receive external multimedia data. Each of the front and rear cameras can be a fixed optical lens system or have focal length and optical zoom capability.

The audio component 910 is configured to output and/or input audio signals. For example, the audio component 910 includes a microphone (MIC) that is configured to receive external audio signals when the apparatus 900 is in operating modes, such as call mode, recording mode, and voice recognition mode. The received audio signal may be further stored in the memory 904 or transmitted via the communication component 916. In some embodiments, the audio component 910 also includes a speaker for outputting audio signals.

The I/O interface 912 provides an interface between the processing component 902 and a peripheral interface module, which may be a keyboard, a click wheel, a button, or the like. These buttons may include, but are not limited to: home button, volume buttons, start button, and lock button.

The sensor assembly 914 includes one or more sensors for providing status assessment of various aspects of the apparatus 900. For example, the sensor assembly 914 can detect the open/closed state of the apparatus 900, the relative positioning of components, such as the display and keypad of the apparatus 900, and the sensor assembly 914 can also detect a change in the position of the apparatus 900 or a component of the apparatus 900, the presence or absence of user contact with the apparatus 900, the orientation or acceleration/deceleration of the apparatus 900 and the temperature change of the apparatus 900. The sensor assembly 914 may include a proximity sensor configured to detect the presence of nearby objects in the absence of any physical contact. The sensor assembly 914 may also include a light sensor, such as a CMOS or CCD image sensor, for use in imaging. In some embodiments, the sensor assembly 914 may also include an acceleration sensor, a gyroscope sensor, a magnetic sensor, a pressure sensor, or a temperature sensor.

The communication component 916 is configured to facilitate wired or wireless communication between the apparatus 900 and other devices. The apparatus 900 may access a wireless network based on a communication standard, such as WiFi, 2G or 3G, 4G LTE, 5G NR (New Radio), or a their combination. In one embodiment, the communication component 916 receives broadcast signals or broadcast related information from an external broadcast management system via a broadcast channel. In an embodiment, the communication component 916 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the apparatus 900 may be implemented by one or more application specific integrated circuits (ASICs), digital signal processors (DSPs), digital signal processing devices (DSPDs), programmable logic devices (PLDs), field programmable A gate array (FPGA), controller, microcontroller, microprocessor or other electronic component implementation for performing the above method.

In an embodiment, there is also provided a non-transitory computer-readable storage medium including instructions, such as a memory 904 including instructions, executable by the processor 920 of the apparatus 900 to perform the method described above. For example, the non-transitory computer-readable storage medium may be ROM, random access memory (RAM), CD-ROM, magnetic tape, floppy disk, optical data storage device, and the like.

Other embodiments of the disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as examples, with the true scope and spirit of the disclosure being indicated by the following claims.

It is to be understood that the disclosure is not limited to the precise structures described above and illustrated in the accompanying drawings, and that various modifications and changes may be made without departing from its scope. The scope of the disclosure is limited by the appended claims.

The above descriptions are preferred embodiments of the disclosure, and are not intended to limit the disclosure. Any modifications, equivalent replacements, improvements, etc. made within the spirit and principles of the disclosure shall be included in the disclosure.

What is claimed is:

1. A method for sharing data, comprising:
    displaying, by a terminal, a data sharing interface, wherein the data sharing interface contains triggering areas respectively corresponding to data sources and association areas respectively corresponding to associated devices; and
    in response to a pairing operation between a triggering area and an association area, obtaining, by the terminal, data from a target data source corresponding to the triggering area and transmitting the data to a target associated device corresponding to the association area, such that the data is output by the target associated device,
    wherein in response to determining that there is an alternative target associated device of the same type as the target associated device among the associated devices of the terminal, the method further comprises:
    in response to detecting that the terminal moves, monitoring, by the terminal, a distance between the terminal and the target associated device, and a distance between the terminal and an alternative target associated device; and
    in response to detecting that the distance between the terminal and the target associated device is less than the distance between the terminal and the alternative target associated device, transmitting, by the terminal, the data obtained from the target data source to the alternative target associated device, such that the alternative target associated device outputs the data.

2. The method of claim 1, further comprising:
    displaying, by the terminal, an operation access entrance for providing a data sharing function;
    wherein displaying the data sharing interface comprises:
    in response to triggering the operation access entrance, displaying the data sharing interface.

3. The method of claim 1, wherein the pairing operation is one of:
    a moving operation for moving the triggering area to the association area;
    a moving operation for moving the association area to the triggering area;
    a sliding operation for sliding from the triggering area to the association area;
    a sliding operation for sliding from the association area to the triggering area; and
    continuous triggering operations for clicking on the triggering area and the association area respectively within a preset duration.

4. The method of claim 1, further comprising:
    determining, by the terminal, a to-be-connected device that is able to establish a data transmission channel with the terminal based on a network where the terminal is located or a built-in short-range communication function, as one associated device.

5. The method of claim 4, further comprising:
in response to determining that the target associated device corresponding to the triggering area is the to-be-connected device, establishing, by the terminal, the data transmission channel between the terminal and the target associated device based on the network where the terminal is located or the built-in short-range communication function.

6. The method of claim 1, wherein obtaining data from the target data source corresponding to the triggering area and transmitting the data to the target associated device corresponding to the association area comprises one of:
in response to determining that the target data source is an audio module of the terminal, obtaining, by the terminal, audio data from the audio module and transmitting, by the terminal, the audio data to the target associated device corresponding to the association area, such that the target associated device outputs a voice signal based on the audio data;
in response to determining that the target data source is a display module of the terminal, obtaining, by the terminal, screen displaying data from the display module and transmitting, by the terminal, the screen displaying data to the target associated device corresponding to the association area, such that the target associated device generates a mirror image of a screen of the terminal based on the screen displaying data and displays the mirror image; or
in response to determining that the target data source is an application installed on the terminal, obtaining, by the terminal, interface drawing data of an application interface from the application and transmitting, by the terminal, the interface drawing data to the target associated device corresponding to the association area, such that the target associated device draws the application interface of the application based on the interface drawing data, and displays the application interface.

7. The method of claim 1, further comprising:
in response to detecting that the terminal moves, monitoring, by the terminal, a distance between the terminal and another associated device other than the target associated device; and
transmitting, by the terminal, the data obtained from the target data source to the another associated device in response to detecting that the distance between the terminal and the another associated device is less than a preset distance, such that the another associated device outputs the data.

8. The method of claim 7, wherein in response to determining that there is the alternative target associated device of the same type as the target associated device among the associated devices of the terminal,
monitoring the distance between the terminal and the another associated device comprises: monitoring, by the terminal, the distance between the terminal and the alternative target associated device; and
transmitting the data obtained from the target data source to the another associated device in response to detecting that the distance between the terminal and the another associated device is less than the preset distance comprises: transmitting, by the terminal the data obtained from the target data source to the alternative target associated device in response to the distance between the terminal and the alternative target associated device is less than the preset distance.

9. The method of claim 1, further comprising:
adding, by the terminal, type labels to the association areas displayed on the data sharing interface based on device types of the associated devices;
wherein the type label is one of a display type device, an audio type device, and a printing type device.

10. The method of claim 1, further comprising:
in response to a triggering operation on an association area, displaying, by the terminal, a control interface of an associated device corresponding to the association area; and
in response to triggering an operation control on a control panel, transmitting, by the terminal, an operation instruction corresponding to the operation control to the associated device corresponding to the association area to instruct the associated device to perform operations corresponding to the operation instruction.

11. An electronic device, comprising:
a processor;
a memory, for storing instructions executable by the processor; and
a display screen;
wherein, when the instructions are executed by the processor, the processor is configured to:
control the display screen to display a data sharing interface, wherein the data sharing interface contains triggering areas respectively corresponding to data sources and association areas respectively corresponding to associated devices; and
in response to a pairing operation between a triggering area and an association area, obtain data from a target data source corresponding to the triggering area and transmit the data to a target associated device corresponding to the association area, such that the data is output by the target associated device,
wherein in response to determining that there is an alternative target associated device of the same type as the target associated device among the associated devices of the electronic device, the processor is further configured to:
in response to detecting that the electronic device moves, monitor a distance between the electronic device and the target associated device, and a distance between the electronic device and an alternative target associated device; and
in response to detecting that the distance between the electronic device and the target associated device is less than the distance between the electronic device and the alternative target associated device, transmit the data obtained from the target data source to the alternative target associated device, such that the alternative target associated device outputs the data.

12. The electronic device of claim 11, wherein the processor is further configured to:
control the display screen to display an operation access entrance for providing a data sharing function; and
in response to triggering the operation access entrance, control the display screen to display the data sharing interface.

13. The electronic device of claim 11, wherein the processor is further configured to perform:
determining a to-be-connected device that is able to establish a data transmission channel with the electronic device based on a network where the electronic device is located or a built-in short-range communication function, as one associated device.

14. The electronic device of claim 13, wherein the processor is further configured to:
in response to determining that the target associated device corresponding to the triggering area is the to-be-connected device, establish the data transmission channel between the electronic device and the target associated device based on the network where the electronic device is located or the built-in short-range communication function.

15. The electronic device of claim 11, wherein the processor is further configured to:
in response to determining that the target data source is an audio module of the electronic device, obtain audio data from the audio module and transmit the audio data to the target associated device corresponding to the association area, such that the target associated device outputs a voice signal based on the audio data;
in response to determining that the target data source is a display module of the electronic device, obtain screen displaying data from the display module and transmit the screen displaying data to the target associated device corresponding to the association area, such that the target associated device generates a mirror image of a screen of the electronic device based on the screen displaying data and displays the mirror image; or
in response to determining that the target data source is an application installed on the electronic device, obtain interface drawing data of an application interface from the application and transmit the interface drawing data to the target associated device corresponding to the association area, such that the target associated device draws the application interface of the application based on the interface drawing data, and displays the application interface.

16. The electronic device of claim 11, wherein the processor is further configured to:
in response to detecting that the electronic device moves, monitor a distance between the electronic device and another associated device other than the target associated device; and
transmit the data obtained from the target data source to the another associated device in response to detecting that the distance between the electronic device and the another associated device is less than a preset distance, such that the another associated device outputs the data.

17. The electronic device of claim 16, wherein in response to determining that there is an alternative target associated device of the same type as the target associated device among the associated devices of the electronic device, the processor is further configured to:
monitor a distance between the electronic device and the alternative target associated device; and
transmit the data obtained from the target data source to the alternative target associated device in response to the distance between the electronic device and the alternative target associated device is less than the preset distance.

18. A non-transitory computer-readable storage medium, having instructions stored thereon, wherein when instructions are executed by a processor of an electronic device, a method for sharing data is executed, the method comprising:
displaying a data sharing interface, wherein the data sharing interface contains triggering areas respectively corresponding to data sources and association areas respectively corresponding to associated devices; and
in response to a pairing operation between a triggering area and an association area, obtaining data from a target data source corresponding to the triggering area and transmitting the data to a target associated device corresponding to the association area, such that the data is output by the target associated device,
wherein in response to determining that there is an alternative target associated device of the same type as the target associated device among the associated devices of the terminal, the method further comprises:
in response to detecting that the terminal moves, monitoring, by the terminal, a distance between the terminal and the target associated device, and a distance between the terminal and an alternative target associated device; and
in response to detecting that the distance between the terminal and the target associated device is less than the distance between the terminal and the alternative target associated device, transmitting, by the terminal, the data obtained from the target data source to the alternative target associated device, such that the alternative target associated device outputs the data.

* * * * *